United States Patent [19]
Hake et al.

[11] Patent Number: 5,514,488
[45] Date of Patent: May 7, 1996

[54] ELECTROCHEMICAL SECONDARY CELL

[75] Inventors: Martin G. Hake, Idstein-Eschenhahn; Peter Krämer, Königstein; Frank Mengel, Ebsdorfergrund, all of Germany

[73] Assignee: Varta Batterie Aktiengesellschaft, Hanover, Germany

[21] Appl. No.: 346,896

[22] Filed: Nov. 30, 1994

[30] Foreign Application Priority Data

Dec. 9, 1993 [DE] Germany .......................... 43 42 039.7

[51] Int. Cl.⁶ ..................................... H01M 6/00
[52] U.S. Cl. ...................... 429/122; 429/128; 429/215; 429/217; 429/218; 429/233; 429/241; 429/245
[58] Field of Search ..................................... 429/122, 224, 429/217, 218, 245, 233, 241, 245, 128; 75/413, 415; 428/613

[56] References Cited

U.S. PATENT DOCUMENTS

| | | |
|---|---|---|
| 4,271,242 | 6/1981 | Toyoguchi et al. ...................... 429/218 |
| 4,416,915 | 11/1983 | Palmer et al. ........................... 429/218 |
| 4,808,494 | 2/1989 | Palmer et al. ........................... 429/101 |
| 4,828,834 | 5/1989 | Nagaura et al. ......................... 429/194 |
| 5,139,902 | 8/1992 | Drews et al. ............................ 429/245 |
| 5,200,282 | 4/1993 | Ohnishi et al. .......................... 429/241 |
| 5,352,548 | 10/1994 | Fujimoto et al. ........................ 429/218 |

FOREIGN PATENT DOCUMENTS 0205856  12/1986  European Pat. Off. .

Primary Examiner—Bruce F. Bell
Attorney, Agent, or Firm—Weiser & Associates

[57] ABSTRACT

An $Li/LiMn_2O_4$ secondary cell employing a SWING system (i.e., of the "rocking chair cell" type) includes a positive electrode formed as a metal gauze-reinforced, rolled electrode, and a negative electrode formed by impregnating a nickel foam with a paste of Li-intercalating graphite. Such electrodes are from 3 to 4 times thicker than the thin-film electrodes fabricated with prior, knife-coating techniques and employed in wound cells, and are therefore particularly suitable for constructing prismatic cells. By prerolling the as yet empty nickel foam to specific thicknesses, the capacity per unit area of the negative electrode can be tailored to that of the positive, rolled electrode. By rerolling the impregnated nickel foam, optimal energy density and electrode capacity is achieved, at a porosity of from 50 to 60%.

20 Claims, No Drawings

ELECTROCHEMICAL SECONDARY CELL

BACKGROUND OF THE INVENTION

The present invention relates to an electrochemical secondary cell having at least one positive electrode with an active material comprised of a lithium-intercalating chalcogen compound of a transition metal, at least one negative electrode with an active material comprised of a lithium-intercalating carbon product, and a non-aqueous electrolyte in a sealed container.

As is well known, the use of lithium metal electrodes in rechargeable cells is subject to severe constraints, due to the tendency of the lithium toward dendrite formation and shedding. However, an extraordinary improvement in the cycling of lithium cells has been made possible with electron-conductive matrix substances which, in the charging/discharging mode, can alternately be loaded with lithium ions as the electrochemically active ion species, and thereafter similarly depleted of such ions (see, e.g., U.S. Pat. No. 4,828,834).

Alluding to the "swing rhythm" by which the lithium alternates between the host lattice of the electrode of one polarity and the host lattice of the electrode of the other polarity, these novel reversible battery systems are sometimes referred to as "SWING systems" by those skilled in the art. In the technical literature, the designations "rocking chair cells" and "lithium ion cells" are also found.

Lithium secondary cells operating as SWING cells usually have, as the lithium-intercalating support matrix substance of the positive electrode, a lithium manganese spinel, $LiMn_2O_4$, or a lithiated transition metal oxide such as $LiCoO_2$ or $LiNiO_2$. In the manganese spinel, some of the manganese may be substituted by other transition metals (e.g., Co and Ni) for the purpose of stabilizing the spinel lattice. The matrix substance of the negative electrode is generally needle coke, an irregularly crystallized carbon product generated by a slow coking process from an organic material, or graphite.

Electrodes for SWING cells containing liquid electrolytes have reached a high degree of technical sophistication, because they are fabricated by processes which parallel other sectors of the industry. For example, in accordance with European Patent No. 205,856, thin-film electrodes having an overall thickness of only 100 µm can be fabricated by matrix substances of the above-mentioned type in finely powdered form (mixed with a conducting medium, if required), pasted with a solution of an adhesive in an organic solvent. The obtained mass is spread on foils made of aluminum or copper (by means of a knife).

The cell types which most suitably use such thin-film electrodes are, as expected, the round cell and the wound cell. However, an unfavorable economy of space and associated heat dissipation problems (which increase with size) render such cells inferior to prismatic cells (which are becoming of greater interest in certain fields of application for batteries, primarily for electrically powered vehicles).

On the other hand, providing prismatic cell containers with known thin-film electrodes tends not to provide a remedy since many thin-film electrodes (in the form of a relatively large, sandwich-like pack) require a high degree of separation, to the detriment of energy density, and are not easily handled.

Thick, knife-coated electrodes having an overall thickness of more than 200 µm cannot be implemented because, with their greater layer thicknesses, adhesion problems tend to occur on the substrate foil. Moreover, an increase in energy density by lowering the porosity (<30%) cannot be achieved in the case of knife-coated electrodes, because excessive rolling leads to their deformation.

SUMMARY OF THE INVENTION

It is therefore the primary object of this invention to provide an electrochemical secondary cell operating according to the SWING principle which has a lithium-intercalating manganese spinel cathode and a lithium-intercalating carbon anode which operate to provide a high energy density, even with a low collector and separator proportion relative to the active material.

It is also an object of the present invention to provide an electrochemical secondary cell operating according to the SWING principle which is simple to fabricate and which is preferentially suitable for use in prismatic cells.

These and other objects are achieved with an electrochemical secondary cell having at least one positive electrode with an active material comprised of a lithium-intercalating chalcogen compound of a transition metal, at least one negative electrode with an active material comprised of a lithium-intercalating carbon product, and a non-aqueous electrolyte in a sealed container. In accordance with the present invention, the positive electrode is formed as a reticulated support matrix which is calender-coated with a plastic-bound lithium manganese spinel, $LiMn_2O_4$, and the negative electrode is formed as a highly porous metal foam support matrix which is impregnated with a graphite paste.

Accordingly, the novel cell is based on the combination of two electrodes which are derived from different electrode technologies, and which complement one another in a very favorable manner. For further detail regarding the electrochemical secondary cell of the present invention, reference is made to the following detailed description.

DETAILED DESCRIPTION OF PREFERRED EMBODIMENTS

The cell of the present invention includes a positive electrode which is formed as a dry mixture of an intercalable matrix material, in this case $LiMn_2O_4$, polytetrafluoroethylene (PTFE) as a binder, and carbon black as a conductive medium, rolled on both sides into a fine-mesh metal gauze. The metal gauze is preferably an aluminum gauze having an aluminum collector lug. The weight per unit area of the finished rolled electrode is 126 mg/cm². The collector lug is preferably connected to a terminal pillar made of aluminum or titanium. The negative electrode, for purposes of accommodating a lithium-intercalating graphite, has a highly porous nickel foam matrix.

The manufacture of metal foams as electron-conductive electrode supports is relatively new. The most commonly used method employs a plastic foam, which is in this state plated with a metal. After removal of the plastic by thermal decomposition, the remaining sponge-like metal matrix is subjected to a roasting treatment. An alternative method is to sinter a mixture of the powdered metal and a pore former, and to thereafter dissolve out the pore former. Yet another alternative method for obtaining a metal foam matrix is to inject a gas into a metal melt, and to thereafter cool the metal melt to generate pores in the resulting structure.

Further according to the present invention, the nickel foam matrix is provided with anodic graphite which is slurried in or pasted in as a suspension in water. The nickel foam structure is also provided with a collector lug formed of sheet steel, and is connected to a terminal pillar (e.g., made of nickeled copper). An advantage of the metal foam substrate is that it becomes possible to set specific porosities, by rerolling the pasted electrode.

Alternatively, the empty nickel foam can be prerolled to a specific thickness in order to incorporate corresponding amounts of active anodic graphite. Since the weight per unit area of the positive rolled electrode cannot be varied, it becomes possible to influence the negative electrode in order to carry out necessary balancing of the cell (i.e., mutual matching of the electrode capacities in such a way that in the charged stated of the cell, the negative electrode is completely lithiated).

Particularly favorable compositions of active materials for the combination of a positive rolled electrode and a negative metal foam electrode in accordance with the present invention are as follows:
Positive rolled electrode:
100 parts by weight of $LiMn_2O_4$ are admixed with

| Parts by Weight | Overall | Preferred |
|---|---|---|
| PTFE | from 3 to 9 | approx. 6.6 |
| Carbon black | from 3.3 to 6.6 | approx. 4.4 |

The constituents of the positive mass are mixed in the dry state and rolled into an aluminum gauze.
Negative graphite-in-nickel-foam electrode:
For one batch, per 100 parts by weight of graphite (grade Lonza KS6, with a particle size for more than 90% of the material <6 μm), the following additions are made.

| Parts by Weight | Overall | Preferred |
|---|---|---|
| Wetting agent | from 0.3 to 1.5 | approx. 0.6 |
| Pigment dispersant | from 1.8 to 3.6 | approx. 2.4 |
| Binder | from 3.6 to 6.6 | approx. 5.1 |
| Dispersant | from 0.6 to 1.5 | approx. 1.1 |
| Plasticizer | from 0.5 to 1.5 | approx. 1.1 |

The constituents of the negative mass are introduced into distilled water with continuous stirring, in the order stated, followed by the graphite. The amount of water should be selected such that a slurry of spreadable consistency is produced. In general, for 100 parts by weight of graphite, approximately 190 parts by weight of water are sufficient. The following substances are particularly suitable for the above additions:

Wetting agent: a 20% strength aqueous solution of an alkyl polyethyleneglycol ether.

Pigment dispersant: a 10% strength aqueous solution of sodium polyacrylate.

Binder: a 50% strength aqueous dispersion of a styrene-acrylate copolymer.

Dispersant: a lignin sulfite (Vanisperse CB, Borregaard Ind. Ltd., Sarpsborg, Norway).

Plasticizer: a polypropyleneglycol alkylphenyl ether.

In fabricating the negative electrode, the wet mixture is preferably stored in a reservoir, from which it is continuously fed (by means of a pump) to a pasting installation. From there, the wet mixture is spread into a running endless strip of nickel foam. The metal foam strip, filled with the wet mixture, then passes a drying zone and is reeled onto a magazine roll. Excess mass skimmed off during the pasting is preferably collected and returned to the storage reservoir via a return line (by means of an additional pump).

A major advantage of the metal foam matrix used for the electrode structure of the present invention is that it can be set to a specific capacity per unit area, by prerolling with a calender. During pasting, the prerolled matrix material then (exhaustively) takes up active material in its pores.

However, during subsequent drying, the evaporating water leaves behind a considerable free pore volume, whereas the pores are filled to only approximately 30% by the dry mass. This would lead to a considerable restriction in terms of energy density. Raising the energy density requires resetting of the porosity, by rerolling. Optimum energy density and capacity are achieved at a porosity of approximately 50–60%.

By combining a positive rolled electrode with a negative metal foam electrode, which are both of the lithium intercalation type, electrodes for constructing secondary SWING cells are made available which are from 3 to 4 times thicker than the thin-film electrodes fabricated with knife-coating techniques (and employed in wound cells). It even becomes possible to construct relatively large, prismatic SWING cells having a far higher capacity and considerably more favorable volumetric energy densities than would be possible with known thin-film electrodes.

As an example, the thickness of positive lithium manganese spinel rolled electrodes produced in accordance with the present invention is approximately 500 μm (thin-film, knife-coated electrodes are at most 200 μm for a single-side foil coating). The weight per unit area of such electrodes, based on their active mass, is approximately 126 mg/cm$^2$, and their porosity is approximately 30%.

Depending on the thickness of the prerolled nickel foam, the thickness after pasting of a metal foam electrode produced in accordance with the present invention is between 700 and 1100 μm. The weight per unit area, based on the active mass, is from 22 to 40 mg/cm$^2$. The porosity is between 81 and 84%. By means of rerolling, a porosity of from 50 to 60% can be set. The final electrode thickness will reach a value of from 300 to 500 μm.

The capacity of a graphite/metal-foam electrode clearly favors the capacity of a graphite/knife-coated electrode. This is shown by subjecting a nickel-foam electrode having a thickness of 815 μm and a weight per unit area of 28.5 mg/cm$^2$ (negative mass only, including additives), and a knife-coated electrode having a thickness of 130 μm and a weight per unit area of 9.2 mg/cm$^2$ (negative mass only), to a current of 2.0 mA/cm$^2$ (the foam electrode on both sides). Virtually the same specific capacities of 299 mAh/g and 295 mAh/g, respectively, were found (both values in each case based on the total negative mass). However, because the mass per unit area is 3 times greater for the foam electrode, its capacity per unit area is 3 times greater.

For testing purposes, a prismatic SWING cell comprising an electrode combination according to the present invention was constructed. In the following tables, Table I gives an overview of the dimensions and properties of the cell, and Table 2 shows the results of cyclic cell treatment.

TABLE 1

Electrode dimensions: 7 cm × 9.4 cm
Separator: Polypropylene, 50 μm, 45% porosity

|  | Positive electrode | Negative electrode |
|---|---|---|
| Number | 18 | 19 |
| Electrode thickness | approx. 500 μm | approx. 810 μm |
| Weight per unit | approx. 126 mg/cm$^2$ | approx. 28 mg/cm$^2$ |

TABLE 1-continued

Electrode dimensions: 7 cm × 9.4 cm
Separator: Polypropylene, 50 μm, 45% porosity

|  | Positive electrode | Negative electrode |
|---|---|---|
| area |  |  |
| Electrode mass | approx. 149 g | approx. 35 g |

TABLE 2

Charging currents: from 2.4 to 0.6 A
Discharging currents: 1.2 A

| Cycle No. | End-of-charge voltage [V] | Charging capacity [Ah] | End-of-discharge voltage [V] | Discharging capacity [Ah] |
|---|---|---|---|---|
| 1 | 4.2 | 16.8 | 3.0 | 11.1 |
| 4 | 4.25 | 11.7 | 3.0 | 11.5 |
| 6 | 4.25 | 11.8 | 3.0 | 11.1 |
| 8 | 4.25 | 14.4 | 3.0 | 11.0 |

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An electrochemical secondary cell having at least one positive electrode with an active material comprised of a lithium-intercalating chalcogen compound of a transition metal, at least one negative electrode with an active material comprised of a lithium-intercalating carbon product, and a non-aqueous electrolyte in a sealed container, wherein the positive electrode is a reticulated support matrix which is calender-coated with a plastic-bound lithium manganese spinel, $LiMn_2O_4$, and wherein the negative electrode is a porous metal foam support matrix which is impregnated with a graphite paste.

2. The electrochemical secondary cell of claim 1 wherein the support matrix of the negative electrode is a nickel foam.

3. The electrochemical secondary cell of claim 1 wherein the graphite paste is a mixture of graphite powder with an aqueous binder dispersion.

4. The electrochemical secondary cell of claim 3 wherein the graphite paste further includes a plasticizer.

5. The electrochemical secondary cell of claim 3 wherein the graphite paste further includes a dispersant.

6. The electrochemical secondary cell of claim 1 wherein, per 100 parts by weight, the graphite paste includes from 3.6 to 6.6 parts by weight of a binder, from 0.6 to 1.5 parts by weight of a dispersant, and from 0.5 to 1.5 parts by weight of a plasticizer.

7. The electrochemical secondary cell of claim 6 which includes approximately 5.1 parts by weight of the binder, approximately 1.1 parts by weight of the dispersant, and approximately 1.1 parts by weight of the plasticizer.

8. The electrochemical secondary cell of claim 6 wherein, per 100 parts by weight, the graphite paste further includes from 0.3 to 1.5 parts by weight of a wetting agent and from 1.8 to 3.6 parts by weight of a pigment dispersant.

9. The electrochemical secondary cell of claim 8 which includes approximately 0.6 parts by weight of the wetting agent and approximately 2.4 parts by weight of the pigment dispersant.

10. The electrochemical secondary cell of claim 6 wherein the graphite paste forms a spreadable slurry in water.

11. The electrochemical secondary cell of claim 10 wherein approximately 190 parts by weight of water are mixed with the 100 parts by weight of the graphite paste.

12. The electrochemical secondary cell of claim 1 wherein the metal foam support matrix has a porosity of from 50 to 60%.

13. The electrochemical secondary cell of claim 1 wherein the lithium manganese spinel includes polytetrafluoroethylene (PTFE) as a binder.

14. The electrochemical secondary cell of claim 13 wherein the lithium manganese spinel further includes carbon black as a conducting medium.

15. The electrochemical secondary cell of claim 14 wherein, per 100 parts by weight, the lithium manganese spinel includes from 3 to 9 parts by weight of the PTFE, and from 3.3 to 6.6 parts by weight of the carbon black.

16. The electrochemical secondary cell of claim 15 which includes approximately 6.6 parts by weight of the PTFE and approximately 4.4 parts by weight of the carbon black.

17. The electrochemical secondary cell of claim 1 wherein the support matrix of the positive electrode is an aluminum mesh.

18. The electrochemical secondary cell of claim 1 wherein the cell container is prismatic in shape.

19. An electrochemical secondary cell having at least one positive electrode with an active material comprised of a lithium-intercalating chalcogen compound of a transitional metal, at least one negative electrode with an active material comprised of a lithium-intercalating carbon product, and a non-aqueous electrolyte in a sealed container, wherein the positive electrode is a reticulated support matrix which is calender-coated with a plastic-bound lithium manganese spinel, $LiMn_2O_4$, and wherein the negative electrode is a porous metal foam support matrix having a thickness between 700 and 1100 μm which is impregnated with a graphite paste.

20. The electrochemical secondary cell of claim 19 wherein the positive electrode has a thickness of approximately 500 μm, and wherein the secondary cell has a total thickness which is suitable for providing high capacities and volumetric energy densities.

\* \* \* \* \*